(12) United States Patent
Joseph et al.

(10) Patent No.: US 12,073,387 B2
(45) Date of Patent: Aug. 27, 2024

(54) SYSTEM AND METHOD OF MULTI-ROUND TOKEN DISTRIBUTION USING A BLOCKCHAIN NETWORK

(71) Applicant: nChain Licensing AG, Zug (CH)

(72) Inventors: Daniel Joseph, London (GB); Silvia Bartolucci, London (GB)

(73) Assignee: nChain Licensing AG, Zug (CH)

( * ) Notice: Subject to any disclaimer, the term of this patent is extended or adjusted under 35 U.S.C. 154(b) by 0 days.

(21) Appl. No.: 17/977,814

(22) Filed: Oct. 31, 2022

(65) Prior Publication Data

US 2023/0120073 A1  Apr. 20, 2023

Related U.S. Application Data

(63) Continuation of application No. 16/625,546, filed as application No. PCT/IB2018/054504 on Jun. 19, 2018, now Pat. No. 11,488,144.

(30) Foreign Application Priority Data

Jun. 20, 2017 (GB) ..................................... 1709868
Jun. 20, 2017 (GB) ..................................... 1709871

(51) Int. Cl.
*H04L 9/32* (2006.01)
*G06Q 20/36* (2012.01)
(Continued)

(52) U.S. Cl.
CPC ..... *G06Q 20/3674* (2013.01); *G06Q 20/3676* (2013.01); *G06Q 20/3827* (2013.01);
(Continued)

(58) Field of Classification Search
CPC ... H04L 9/3239; H04L 9/3215; H04L 9/3236; H04L 9/50; H04L 2209/56;
(Continued)

(56) References Cited

U.S. PATENT DOCUMENTS 10,491,402 B2    11/2019  Kaehler
10,692,325 B2*    6/2020  Simons ............... G07F 17/3262
(Continued)

FOREIGN PATENT DOCUMENTS

KR     101701131 B1    2/2017
KR     101727525 B1    4/2017
WO    2017079652 A1    5/2017

OTHER PUBLICATIONS

Andreas M. Antonopoulos, "Mastering Bitcoin" (Jun. 12, 2017) (Year: 2017).*

(Continued)

*Primary Examiner* — Samson B Lemma
(74) *Attorney, Agent, or Firm* — Davis Wright Tremaine LLP (57) ABSTRACT

A computer-implemented method to participate in a token transfer process for transferring a first quantity of token from a sender node to a recipient node using a blockchain is disclosed. The token transfer process includes a plurality of participating nodes and execution of a set of indirect token transactions between multiple pairs of the participating nodes. The method is implemented at a participating node performing steps of obtaining a subset of the indirect token transactions for which the participating node is either an input node or an output node, collaborating with a respective second participating node included in each indirect token transaction of the subset to generate a commitment channel for the indirect token transaction between the participating node and a second participating node, and collaborating with all other participating nodes in executing the indirect token transactions of the subset using the generated commitment channels.

8 Claims, 6 Drawing Sheets

(51) Int. Cl.
    *G06Q 20/38*     (2012.01)
    *G06Q 20/40*     (2012.01)
    *H04L 9/00*     (2022.01)

(52) U.S. Cl.
    CPC ....... *G06Q 20/3829* (2013.01); *G06Q 20/401* (2013.01); *H04L 9/3215* (2013.01); *H04L 9/3239* (2013.01); *H04L 9/3236* (2013.01); *H04L 9/50* (2022.05); *H04L 2209/56* (2013.01)

(58) Field of Classification Search
    CPC ........... G06Q 20/3674; G06Q 20/3676; G06Q 20/3827; G06Q 20/3829; G06Q 20/401
    USPC ......................................................... 713/164
    See application file for complete search history.

(56) References Cited

U.S. PATENT DOCUMENTS

| | | | |
|---|---|---|---|
| 10,887,090 | B2 | 1/2021 | Li et al. |
| 11,240,003 | B2* | 2/2022 | Cao ....................... G06F 21/645 |
| 11,488,144 | B2 | 11/2022 | Matsuda et al. |
| 2015/0081566 | A1 | 3/2015 | Slepinin |
| 2016/0210626 | A1 | 7/2016 | Ortiz et al. |
| 2016/0253663 | A1 | 9/2016 | Clark et al. |
| 2016/0344550 | A1 | 11/2016 | Anton et al. |
| 2017/0091750 | A1 | 3/2017 | Maim |
| 2017/0149819 | A1 | 5/2017 | Androulaki et al. |
| 2017/0187535 | A1 | 6/2017 | Middleton et al. |
| 2017/0230189 | A1 | 8/2017 | Toll et al. |
| 2017/0236121 | A1 | 8/2017 | Lyons et al. |
| 2017/0301047 | A1 | 10/2017 | Brown et al. |
| 2017/0337534 | A1 | 11/2017 | Goeringer et al. |
| 2018/0285838 | A1 | 10/2018 | Franaszek et al. |
| 2018/0285996 | A1 | 10/2018 | Ma |
| 2018/0308091 | A1 | 10/2018 | Malkhi et al. |
| 2019/0043043 | A1* | 2/2019 | Saraniecki ............ H04L 9/3239 |
| 2019/0228391 | A1 | 7/2019 | Hu et al. |
| 2019/0268147 | A1 | 8/2019 | Baird, III |
| 2020/0082361 | A1 | 3/2020 | Chan et al. |
| 2021/0090037 | A1 | 3/2021 | Dowding |
| 2021/0090072 | A1* | 3/2021 | Sewell ................ G06Q 20/3678 |
| 2021/0182433 | A1 | 6/2021 | Yan et al. |
| 2022/0004539 | A1* | 1/2022 | De Caro ............. G06F 21/6245 |

OTHER PUBLICATIONS

UK Commercial Search Report mailed Aug. 9, 2017, Patent Application No. GB1708192.8, 5 pages.
UK Commercial Search Report mailed Aug. 9, 2017, Patent Application No. GB1708196.9, 5 pages.
UK Commercial Search Report mailed Aug. 9, 2017, Patent Application No. GB1708198.5, 5 pages.
UK Commercial Search Report mailed Aug. 9, 2017, Patent Application No. GB1708200.9, 5 pages.
UK Commercial Search Report mailed Aug. 9, 2017, Patent Application No. GB1708190.2, 5 pages.
UK Commercial Search Report mailed Nov. 1, 2017, Patent Application No. GB511037, 7 pages.
UK IPO Search Report mailed Nov. 14, 2017, Patent Application No. GB1708185.2, 7 pages.
UK IPO Search Report mailed Nov. 14, 2017, Patent Application No. GB1708190.2, 7 pages.
UK IPO Search Report mailed Nov. 14, 2017, Patent Application No. GB1708192.8, 8 pages.
UK IPO Search Report mailed Nov. 14, 2017, Patent Application No. GB1708196.9, 7 pages.
UK IPO Search Report mailed Nov. 14, 2017, Patent Application No. GB1708198.5, 7 pages.
UK IPO Search Report mailed Nov. 14, 2017, Patent Application No. GB1708200.9, 7 pages.
UK IPO Search Report mailed Nov. 24, 2017, Patent Application No. GB1709868.2, 5 pages.
Wikipedia, "Atomic Swap," retrieved from https://en.bitcoin.it/wiki/Atomic_swap, Dec. 2018, 3 pages.
Wilkinson, "Introduction to Micropayment Channels," retrieved from http://super3.org/introduction-to-micropayment-channels/, Apr. 13, 2016, 4 pages.
Wirdum, "How the Lightning Network Layers Privacy on Top of Bitcoin," retrieved from https://bitcoinmagazine.com/articles/how-the-lightning-network-layers-privacyon-top-of-bitcoin-1482183775/, Dec. 19, 2016, 5 pages.
Wright, "Reddit/Ethereum Forum," retrieved from http://www.reddit.com/r/Bitcoin/comments/3w027x/drcraig_stevenwrightallegedsatoshi>by_wired/, Dec. 8, 2015, 24 pages.
Decker et al., "A Fast and Scalable Payment Network with Bitcoin Duplex Micropayment Channels," Symposium on Self-Stabilizing Systems, Aug. 18, 2015, 16 pages.
Ziegeldorf et al., "Secure and Anonymous Decentralized Bitcoin Mixing", Future Generation Computer Systems, vol. 80, Mar. 2018, 28 pages.
Duffield et al., Darkcoin: Peer-to-Peer Crypto-Currency with Anonymous Blockchain Transactions and an Improved Proof-of-Work System, Mar. 18, 2014, 7 pages.
Ruffing et al., "CoinShuffle: Practical Decentralized Coin Mixing for Bitcoin", ESORICS, 2014, 20 pages.
Coutu, Olivier, Privacy in Bitcoin Through Decentralized Mixers, Apr. 30, 2014, 118 pages.
Zhdanova et al., "No Smurfs: Revealing Fraud Chains in Mobile Money Transfers" 2014 Ninth International Conference on Availability, Reliability and Security, IEEE, Sep. 8, 2014, 11 pages.
Anonymous, "Atomic Cross-Chain Trading—Bitcoin Wiki," retrieved from https://en.bitcoin.it/w/index.php? title=Atomic_cross-chain_trading&oldid=47993, Jun. 8, 2014, 4 pages.
Anonymous, "Hierarchical Deterministic Wallets—BIP32," retrieved from https://github.com/bitcoin/bips/blob/11b0fa37bee4eac40c3a1be0591078688bcc3392/bip-0032.mediawiki, Feb. 25, 2017, 9 pages.
Antonopoulos et al., "Bitcoin Book," GitHub, retrieved from https://github.com/bitcoinbook/bitcoinbook, Jun. 8, 2017, 4 pages.
Antonopoulos, "Bitcoin Book, " GitHub, retrieved from https://github.com/bitcoinbook/bitcoinbook, Feb. 2, 2018, 4 pages.
Antonopoulos, "Mastering Bitcoin—Unlocking Digital Cryptocurrencies," O'Reilly Media, Inc., Dec. 20, 2014, 282 pages.
Armknecht et al., "Ripple: Overview and Outlook," retrieved from https://www.researchgate.net/profile/Avikarsha_Mandal/publication/281631024_Ripple_Overview_and_Outlook/links/55f1434c08aef559dc4700f4/Ripple-Overview-and-Outlook.pdf, Aug. 2015, 19 pages.
Barber et al., "Bitter to Better—How to Make Bitcoin a Better Currency," International Conference on Financial Cryptography and Data Security, Feb. 27, 2012, http://elaineshi.com/docs/bitcoin.pdf, 15 pages.
Bentov, "Bitcoin and Secure Computation with Money," retrieved from http://www.cs.technion.ac.il/users/wwwb/cgi-bin/tr-get.cgi/2017/PHD/PHD-2017-02.pdf, Feb. 2017, 177 pages.
Bissias et al., "Sybil-Resistant Mixing for Bitcoin," Proceedings of the 13th Workshop on Privacy in the Electronic Society, Nov. 3, 2014, http://forensics.umass.edu/pubs/bissias.wpes.2014.pdf, 10 pages.
Bitcoin Stack Exchange, "Custom Validation Logic for Transactions/Custom Script Extensions," retrieved from https://bitcoin.stackexchange.com/questions/4125/custom-validation-logic-for-transactions-custom-script-extensions, 2013, 3 pages.
Bitfury Group, "Digital Assets on Public Blockchains," White Paper, BitFury Group Limited, Mar. 15, 2016, http://pitfury.com/content/5-white-papers-research/bitfury-digital_assets_on_public_blockchains-1.pdf, 37 pages.
Bitfury Group, "Smart Contracts on Bitcoin Blockchain," BitFury Group Limited, Aug. 13, 2015 (updated Sep. 4, 2015), http://bitfury.com/content/5-white-papers-research/contracts-1.1.1.pdf, 20 pages.
Boden, "A Forensic Analysis on Cryptocurrencies: Is There Legitimate use for Organisations?" Birmingham City University, 2016, 86 Pages.

(56) References Cited

OTHER PUBLICATIONS

Coleman, "Bitcoin/Bips," retrieved from https://github.com/bitcoin/bips/blob/11b0fa37bee4eac40c3a1be0591078688bcc3392/bip-0032.mediawiki, GitHub, Feb. 24, 2017, 15 pages.
Deathandtaxes, "Using a DHT to Reduce the Resource Requirements of Full Nodes," retrieved from https://bitcointalk.org/index.php?topic=662734.0, Jun. 23, 2014, 11 pages.
Dikshit et al., "Efficient weighted threshold ECDSA for securing bitcoin wallet," 2017 ISEA Asia Security and Privacy (ISEASP), http://ieeexplore.ieee.org/document/7976994/, Jan. 29, 2017, 10 pages.
Eragmus, "Dr. Craig Wright (alleged Satoshi, by Wired) on YouTube, From Bitcoin Investor Conference at Las Vegas," retrieved from https://www.reddit.com/r/Bitcoin/comments/3w027x/dr_craig_steven_, Jun. 22, 2017, 24 pages.
Fangolo et al., "Sergio Lerner: I Think I Will Start Working on a New Soft-Fork For Bitcoin to Add Turing-Complete Scripting, Called Bit2. CLTV/CSTV Made With Std Opcodes," retrieved from https://www.reddit.com/r/ethereum/comments/468hdc/sergio_lerner_i_think_i_will_start_working_on_a/, Feb. 17, 2016, 7 pages.
Goldfeder et al., "Securing Bitcoin wallets via threshold signatures" Princeton's Center for Information Technology Policy, Mar. 28, 2014, 11 pages.
Greatwolf, "What Happens if Everyone Prunes Blocks?" retrieved from https://www.reddit.com/r/Bitcoin/comments/3det7n/what_happens_if_everyone_prunes_bloc ks/, Jul. 15, 2015, 7 pages.
Green et al., "Bolt: Anonymous Payment Channels for Decentralized Currencies," retrieved from https://eprint.iacr.org/2016/701.pdf, 2016, 32 pages.
Heilman et al., "Blindly Signed Contracts: Anonymous On-Blockchain and Off-Blockchain Bitcoin Transactions," International Conference on Financial Cryptography and Data Security, Feb. 22, 2016, 15 pages.
Heilman et al., "TumbleBit: An Untrusted Tumbler for Bitcoin-Compatible Anonymous Payments," International Association for Cryptologic Research, Jun. 3, 2016, 14 pages.
International Search Report and Written Opinion for Application No. PCT/IB2018/053335, mailed Aug. 1, 2018, filed May 14, 2018, 11 pages.
International Search Report and Written Opinion for Application No. PCT/IB2018/053338, mailed Aug. 1, 2018, filed May 14, 2018, 11 pages.
International Search Report and Written Opinion for Application No. PCT/IB2018/053339, mailed Jul. 20, 2018, filed May 14, 2018, 11 pages.
International Search Report and Written Opinion for Application No. PCT/IB2018/054505, mailed Sep. 13, 2018, iled Jun. 19, 2018, 14 pages.
International Search Report and Written Opinion mailed Aug. 1, 2018, International Patent Application No. PCT/IB2018/053337, filed May 14, 2018, 11 pages.
International Search Report and Written Opinion mailed Jul. 23, 2018, International Patent Application No. PCT/IB2018/053336, filed May 14, 2018, 12 pages.
International Search Report and Written Opinion mailed Jul. 23, 2018, International Patent Application No. PCT/IB2018/053340, filed May 14, 2018, 12 pages.
International Search Report and Written Opinion mailed Sep. 11, 2018, Patent Application No. PCT/IB2018/054504, 15 pages.
Jesionek et al., "BIP0032: Hierarchical Deterministic Wallets," GitHub, https://github.com/bitcoin/bips/blob/master/bip-0032.mediawiki, Jan. 2014, 9 pages.
Kaminsky, "I Tried to Hack Bitcoin and Failed," retrieved from https://www.reddit.com/r/Bitcoin/comments/1c7lzi/tried_to_hack_bitcoin_and_failed_dan_kaminsky/aminsky/, Sep. 9, 2010, 24 pages.

Killerstorm, "Coin Mixing using Chaum's Blind Signatures," retrieved from https://bitcointalk.org/index.php?topic=150681.0, Oct. 24, 2017, 7 pages.
Lerner, "Ethereum Comments," retrieved from https://www.reddit.com/r/ethereum/comments/468hdc/sergio_lerner_i_think_i_will_start_working_on_a/, Feb. 16, 2016, 7 pages.
Liu et al., "Speedy: A Sybil-Resistant DHT Implementation," retrieved from https://courses.csail.mit.edu/6.857/2014/files/25-liu-long-thaker-zheng-speedy-dht.pdf, Mar. 15, 2014, 13 pages.
Nakamoto, "Bitcoin: A Peer-to-Peer Electronic Cash System," Bitcoin, Oct. 31, 2008, https://bitcoin.org/bitcoin.pdf, 9 pages.
Novetta, "Survey of Bitcoin Mixing Services: Tracing Anonymous Bitcoins," Novetta White Paper, Sep. 2015, 19 pages.
Okupski, "Bitcoin Developer Reference," retrieved from https://lopp.net/pdf/Bitcoin_Developer_Reference.pdf, Jul. 30, 2016, 43 pages.
Pair et al., "Re: [Bitcoin-development] Blocking Uneconomical UTXO Creation," email thread, retrieved from https://www.mail-archive.com/search?l=bitcoin-development@lists.sourceforge.net&q=subject:%22\[Bitcoin\-development\]+Blocking+uneconomical+UTXO+creation%22&o=newest&f=1, Mar. 12, 2013, 10 pages.
Piachu, "Custom Validation Logic for Transactions/Custom Script Extensions," retrieved from https://bitcoin.stackexchange.com/questions/4125/custom-validation-logic-for-transactions- custom-script-extensions, Sep. 8, 2017, 5 pages.
Poon et al., "The Bitcoin Lightning Network: Scalable Off-Chain Instant Payments," https://www.bitcoinlightning.com/wp-content/uploads/2018/03/lightning-network-paper.pdf, Jan. 14, 2016 [retrieved Dec. 10, 2018], 59 pages.
Priest, Op_CheckWildCardSigverify or "Wildcard Inputs" or "Coalescing Transactions," retrieved from <http://www.reddit.com/r/bitcoindevlist/comments/3vzm2i/op_checkwidcardsigverify_orwid>_checkwildcard inputs or/ Nov. 24, 2015, 52 pages.
Ruffing et al., "Mixing Confidential Transactions: Comprehensive Transaction Privacy for Bitcoin," International Association for Cryptologic Research, Mar. 9, 2017, 22 pages.
Ruffing et al., "P2P Mixing and Unlinkable Bitcoin Transactions," International Association for Cryptologic Research, Aug. 24, 2016, 15 pages.
Satoshi et al., "Connection Limits," Bitcoin Forum, Aug. 9, 2010, https://bitcointalk.org/index.php?topic=741.0;prev_next=prev, 2 pages.
Selij et al., "CoinShuffle Anonymity in the Block Chain," retrieved from http://delaat.net/rp/2014-2015/p77/report.pdf, Jul. 20, 2015, 36 pages.
Smart Contracts, "Smart Contracts/EVM FAQ," retrieved from https://web.archive.org/web/20170719092538/https://counterparty.io/docs/faq-smartcontracts/, Jul. 19, 2017, 7 pages.
Todd, "Building Blocks of the State Machine Approach to Consensus," petertodd.org, Jun. 20, 2016 [retrieved Feb. 5, 2018], https://petertodd.org/2016/state-machine-consensus-building-blocks, 15 pages.
UK Commercial Search Report mailed Aug. 9, 2017, Patent Application No. GB1708185.2, 5 pages.
UK IPO Search Report mailed Nov. 24, 2017, Patent Application No. GB1709871.6, 5 pages.
Moser et al., "An Inquiry Into Money Laundering Tools in the Bitcoin Ecosystem", Sep. 2013, APWG eCrime Researches Summit, 17 pages.
Narayanan, A. et al. "Textbook on Cryptocurrency" 1st Edition, Japan, Nikkei BP Inc., Dec. 9, 2016, 18 pages.
Mutto Morikawa Getosha Media Consulting, "Darksend" Japan, 2016, MachineTranslation, 6 pages.
Japan Patent Office, "Notice of Reasons for Rejection" in Application No. 2019-566668, May 10, 2022, 7 pages.

* cited by examiner

SYSTEM AND METHOD OF MULTI-ROUND TOKEN DISTRIBUTION USING A BLOCKCHAIN NETWORK

CROSS REFERENCE TO RELATED APPLICATIONS

This application is a continuation of U.S. patent application Ser. No. 16/625,546, filed Dec. 20, 2019, entitled "SYSTEM AND METHOD OF MULTI-ROUND TOKEN DISTRIBUTION USING A BLOCKCHAIN NETWORK," which is a 371 National Stage of International Patent Application No. PCT/IB2018/054504, filed Jun. 19, 2018, which claims priority to United Kingdom Patent Application No. 1709868.2, filed Jun. 20, 2017, and United Kingdom Patent Application No. 1709871.6, filed Jun. 20, 2017, the disclosures of which are incorporated herein by reference in their entirety.

BACKGROUND

This invention relates generally to blockchain transactions, and more particularly to methods and devices for structuring and executing transactions in which outputs and inputs are delinked in a manner that still ensures security and full completion of the set of transactions. In particular, the present application provides methods and systems for a plurality of input nodes to collaboratively distribute tokens to a plurality of output nodes in a secure and deterministic manner that prevents token loss and theft, whilst preserving a trustless network structure.

SUMMARY

In this document we use the term 'blockchain' to include all forms of electronic, computer-based, distributed ledgers. These include, but are not limited to blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to herein for the purpose of convenience and illustration, it should be noted that the invention is not limited to use with the Bitcoin blockchain and alternative blockchain implementations and protocols fall within the scope of the present invention.

A blockchain is a consensus-based, electronic ledger which is implemented as a computer-based decentralised, distributed system made up of blocks which in turn are made up of transactions. Each transaction is a data structure that encodes the transfer of control of a digital asset between participants in the blockchain system, and includes at least one input and at least one output. Each block contains a hash of the previous block to that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

In order for a transaction to be written to the blockchain, it must be "validated". Network nodes (miners) perform work to ensure that each transaction is valid, with invalid transactions rejected from the network. Software clients installed on the nodes perform this validation work on an unspent transaction (UTXO) by executing its locking and unlocking scripts. If execution of the locking and unlocking scripts evaluate to TRUE, the transaction is valid and the transaction is written to the blockchain. Thus, in order for a transaction to be written to the blockchain, it must be i) validated by the first node that receives the transaction—if the transaction is validated, the node relays it to the other nodes in the network; and ii) added to a new block built by a miner; and iii) mined, i.e. added to the public ledger of past transactions.

Transactions involves the transfer of one or more tokens from one node to another node. Tokens may represent future control of network resources. In some cases, the tokens may represent an asset or value, but not necessarily. For example, in some cases, the tokens may be understood as a cryptocurrency. However, the present application is not limited to implementations in the context of cryptocurrency and is more broadly understood as relating to blockchain networks for distributed transfer of control tokens.

One of the perceived advantages of blockchain technology, such as Bitcoin, is the anonymity of transactions. Personal details of a Bitcoin user are not formally and explicitly attached to Bitcoin addresses, and the Bitcoin ledger of the blockchain only contains public address information. However, using secondary data (e.g. a shipping address required to complete a transaction) and analytics, interested third parties may be able to combine publicly available information to associate the identities of users to specific Bitcoin addresses.

In order to facilitate greater levels of anonymity in the Bitcoin protocol, a mixing solution may be implemented. In centralized mixing, a set of participants, where at least one participant seeks to move blockchain tokens from one address to another, transfer their tokens to a central pool that is governed by a mixing service provider. The service provider then distributes the tokens from the central pool to appropriate output addresses. A mixing protocol relies on the trustworthiness of the service provider, which has knowledge of the input-output relationships of other participants. This centralized structure can be problematic as (1) a dishonest mixing service may try to steal users' tokens, and (2) a mixing service may be pressured by regulatory bodies or other interested parties to release the mapping of input and output addresses. More generally, mixing is a specific type of distribution protocol by which a plurality of input nodes distribute control over a number of tokens among a plurality of output nodes.

Many token distribution services and potential protocols may suffer from either poor delinking or compromised security. For a distribution protocol to be effective in the context of a distributed blockchain network, it must be designed and operated so as to try to minimize reliance on centralized authority yet ensure completion by all participating nodes to avoid malicious or unbalanced outcomes in token distribution. Thus, it is desirable to provide improved methods and devices for facilitating token distribution, while avoiding token loss or theft and while ensuring the process is implemented so as to be "trustless". Implementing such a process in a distributed blockchain network without using centralized authorities presents a significant technical challenge. In a multi-round token distribution process, it is particularly challenging to ensure the prescribed token distribution is realized and to guard against intentional or accidental misallocation of tokens, for example due to an offline participant node during one or more rounds of the process.

Such an improved solution has now been devised.

Thus, in accordance with the present invention there are provided methods and devices as defined in the appended claims.

The invention may provide a computer-implemented method and corresponding system. The method/system may be described as a blockchain-implemented method/system. The invention may be described as a security method or cryptographic method/system. It may provide for the secure transfer of a digital asset such as a portion or quantity of cryptocurrency. Additionally or alternatively, it may provide a control mechanism for controlling the transfer of a digital asset such as a portion or quantity of cryptocurrency.

The present application describes a computer-implemented method to participate in a token transfer process for transferring a first quantity of tokens from a sender node to a recipient node using a blockchain, the token transfer process including a plurality of participating nodes and execution of a set of indirect token transactions between multiple pairs of the participating nodes, the sender node and the recipient node being included in the token transfer process as participating nodes. The method, implemented at a participating node, includes: obtaining a subset of the set of indirect token transactions, the subset including those transactions for which the participating node is either an input node or an output node, wherein the set of indirect token transactions is generated based on the first quantity of tokens and a predefined number of transaction rounds in the token transfer process; for each indirect token transaction in the subset, collaborating with a respective second participating node included in the indirect token transaction to generate a commitment channel for the indirect token transaction between the participating node and the second participating node; and collaborating with all other participating nodes in executing the indirect token transactions of the subset using the generated commitment channels.

In some implementations, generating the commitment channel for the indirect token transaction includes: collaborating with the second participating node to: generate a first blockchain transaction ($T_c$) for committing an indirect quantity of tokens to transfer to an output address of the indirect token transaction; generate a second blockchain transaction ($T_{r,0}$) that returns the committed indirect quantity of tokens to an input address of the indirect token transaction; and generate a third blockchain transaction ($T_t$) for executing transfer of the committed indirect quantity of tokens to the output address of the indirect token transaction.

In some implementations, the first blockchain transaction ($T_c$) is submitted to the blockchain after the second blockchain transaction ($T_{r,0}$) is signed by an output node of the indirect token transaction.

In some implementations, the second blockchain transaction ($T_{r,0}$) includes a transaction parameter (nLockTime) specifying a point in time after which the second blockchain transaction becomes eligible for submission to the blockchain.

In some implementations, the method may further involve obtaining a key share ($k_i$) of a first private key (k), the first private key being unknown to all of the participating nodes and collaborating in deriving a first public key (Q) corresponding to the first private key (k) using secret share joining.

In some implementations, the third blockchain transaction ($T_t$) includes an unlocking script containing a secret value (sv) that is based on the first private key (k).

In some implementations, collaborating with all other participating nodes in executing the indirect token transactions of the subset includes collaborating with all other participating nodes in deriving the first private key (k) using the key share.

In some implementations, the secret value is the sum of the first private key (k) and a random number provided by an output node of the indirect token transaction.

In some implementations, the method may further involve verifying the validity of the key share ($k_i$) and its compatibility with the first public key (Q) using a publicly verifiable secret sharing scheme (PVSS).

In some implementations, collaborating in deriving the first public key (Q) includes calculating a term of a first Lagrange polynomial interpolation that includes the key share, and summing the term with terms of the first Lagrange polynomial provided by all other participating nodes.

In some implementations, the set of indirect token transactions is further based on a predefined number of transactions per transaction round.

In some implementations, the participating nodes include a plurality of sender-recipient pairs and wherein the set of indirect token transactions is generated based on respective quantities of tokens associated with the plurality of sender-recipient pairs.

In some implementations, for each indirect token transaction of the set, an indirect quantity of tokens for the indirect token transaction is less than a threshold value that is dependent on committed quantity of tokens made available by the transferor.

The present application further describes computing devices for performing the described methods, where the computing devices include at least one processor, memory, a network interface, and a blockchain application containing processor-executable instructions that, when executed, cause the processor to carry out the described operations of one or more of the methods described herein.

The present application further describes non-transitory processor-readable medium storing processor-executable instructions to participate in a token transfer process among a plurality of participating nodes, wherein the processor-executable instructions, when executed by a processor in one of the participating nodes, cause the processor to carry out the operations of one or more of the methods described herein.

The present application further describes a computer-implemented method to initiate a token transfer process for transferring respective first quantities of tokens between a plurality of pairs of sender nodes and respective recipient nodes using a blockchain. The method includes: determining a number of transaction rounds in the token transfer process; generating a set (TT) of indirect token transactions based on the respective first quantities of tokens and the number of transaction rounds, wherein execution of all of the indirect token transactions in the set results in net transfer of the respective quantities of tokens from the sender nodes to their respective recipient nodes and wherein the set of indirect token transactions includes randomized pairings of the sender nodes and recipient nodes in which each may be an input node or an output node for a particular indirect token transaction; and for each of the sender and recipient nodes, transmitting a subset of the set of indirect token transactions to that node, the subset including those transactions for which that node is either the input node or the output node.

In some implementations, the set of indirect token transactions includes a first group of randomly generated transactions, each transaction in the first group specifying a respective indirect token quantity for transfer between a randomly selected pair of participating nodes.

In some implementations, the indirect token quantity is randomly selected.

In some implementations, the indirect token quantity is determined from a probability distribution.

In some implementations, the indirect token quantity is less than or equal to a threshold amount.

In some implementations, the set of indirect token transactions further includes a second group of transactions for reconciling net token transfer resulting from the first group of transactions with the net transfer of the first quantities of tokens between the sender node and the recipient node.

In some implementations, transmitting the subset to the participating node comprises sending an encrypted message containing the subset to the participating node, the message being encrypted using a public key associated with the participating node.

In some implementations, the set of indirect token transactions is generated based on a number of transactions per round (q).

The present application further describes computing devices to initiate a token transfer process that includes a plurality of participating nodes, where the computing devices include memory, a network interface to provide network connectivity, and a processor configured to carry out the methods described herein.

The present application further describes non-transitory processor-readable medium storing processor-executable instructions to initiate a token transfer process among a plurality of participating nodes, wherein the processor-executable instructions, when executed by a processor, cause the processor to carry out the operations of one or more of the methods described herein.

BRIEF DESCRIPTION OF THE DRAWINGS

Any feature described in relation to one aspect or embodiment of the invention may also be used in respect of one or more other aspects/embodiments. These and other aspects of the present invention will be apparent from and elucidated with reference to, the embodiment described herein. An embodiment of the present invention will now be described, by way of example only, and with reference to the accompany drawings, in which.

DETAILED DESCRIPTION

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

Figure 1:
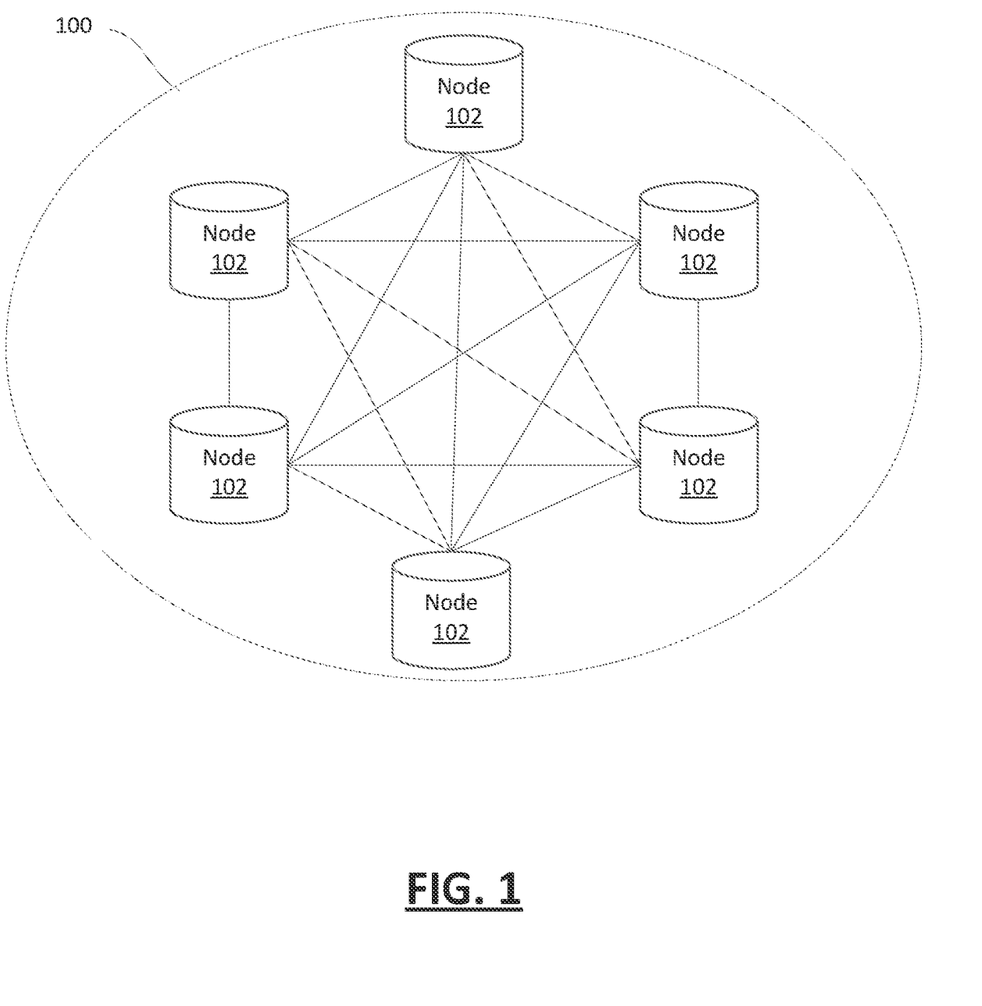
FIG. 1 illustrates an example blockchain network of nodes.

Reference will first be made to FIG. 1 which illustrates, in block diagram form, an example blockchain network 100 associated with a blockchain. The blockchain network is a peer-to-peer open membership network which may be joined by anyone, without invitation or without consent from other members. Distributed electronic devices running an instance of the blockchain protocol under which the blockchain network 100 operates may participate in the blockchain network 100. Such distributed electronic devices may be referred to as nodes 102. The blockchain protocol may be a Bitcoin protocol, or other cryptocurrency, for example.

The electronic devices that run the blockchain protocol and that form the nodes 102 of the blockchain network 100 may be of various types including, for example, computers such as desktop computers, laptop computers, tablet computers, servers, mobile devices such a smartphones, wearable computers such as smart watches or other electronic devices.

Nodes 102 of the blockchain network 100 are coupled to one another using suitable communication technologies which may include wired and wireless communication technologies. In many cases, the blockchain network 100 is implemented at least partly over the Internet, and some of the individual nodes 102 may be located in geographically dispersed locations.

Nodes 102 maintain a global ledger of all transactions on the blockchain. The global ledger is a distributed ledger and each node 102 may store a complete copy or a partial copy of the global ledger. Transactions by a node 102 affecting the global ledger are verified by other nodes 102 so that the validity of the global ledger is maintained. The details of implementing and operating a blockchain network, such as one using the Bitcoin protocol, will be appreciated by those ordinarily skilled in the art.

Each transaction typically has one or more inputs and one or more outputs. Scripts embedded into the inputs and outputs specify how and by whom the outputs of the transactions can be accessed. The output of a transaction may be an address to which tokens are transferred as a result of the transaction. Those tokens are then associated with that output address as an available transaction output. In the context of a cryptocurrency, like Bitcoin, an available transaction output may be referred to as an unspent transaction output (UTXO). A subsequent transaction may then reference that address as an input in order to transfer those tokens to one or more other addresses.

While the transactions are pseudo-anonymous in that no personal information is contained in the transactions on the blockchain ledger, it is possible to trace the transfer of tokens in chains of transactions and, in some cases, to link tokens to an individual using external data. In order to increase anonymity, a mixing transaction may be used to pool inputs from a variety of sources and then to divide and allocate the pooled tokens to outputs. If all the inputs and outputs are the same size, it is difficult to associate a particular input with a particular output. However, in such transactions at least one participating node is aware of the linkage between an input address and output address specified by another participating node. In such mixing transactions, such as a CoinJoin operation in the Bitcoin protocol, a single transaction having multiple inputs and multiple outputs is used to mix the tokens.

Some other anonymizing techniques are used to try to avoid revealing links between an input and an output, such as ring signatures or stealth addresses, with varied effectiveness. Stealth addresses try to de-link the output address to which tokens are sent from a particular user. Ring signatures try to make a source untraceable by making it equiprobable that any one of a group of possible signatories was the one that signed/authorized a particular transaction. Unfortunately, ring signatures have proven to be problematic to implement in some protocols, such as Bitcoin. Some other cryptocurrencies, such as Monero, are specifically designed to enable ring signatures.

The present disclosure provides a token transfer protocol for disguising the movement of tokens between a transferor and a transferee by using a set of indirect token transactions among the participants of the protocol. Specifically, a security mechanism is described which requires the set of indirect token transactions of the token transfer protocol to be validated by all participating nodes of the protocol before any of the transactions can be executed. Such security mechanism prevents the remaining participating nodes from being negatively affected if one or more malicious participating nodes do not carry out their assigned operations under the protocol. The set of indirect token transactions includes a plurality of transfers of varying amounts between different, randomized pairs of participating nodes of the protocol. Upon completion of the indirect token transactions stipulated by the protocol, specified tokens will have been indirectly transferred from the transferor to the transferee.

More generally, the present disclosure provides a protocol which may be implemented to effect desired token transfers between multiple transferor-transferee pairs. The protocol may include a plurality of participating nodes, where each participating node makes or receives one or more token transfers to/from another participating node. The desired transfer of tokens for the transferor-transferee pairs may be implemented using a set of indirect token transactions between varied pairs of participating nodes in the protocol. The indirect token transactions are implemented in such a way as to ensure completion the protocol and avoid failure of the protocol after only some of the transfers have occurred, thereby ensuring that the appropriate token transfers arrive at their respective intended destinations. In some implementations, commitment channels are used to facilitate the indirect token transactions. As will be described below, participating nodes may be able to check that commitment channels have been constructed according to the protocol requirements. In this way, the protocol provides a secure way of ensuring that the protocol is fully implemented without risk of partial completion and consequent failure to realize the desired final allocation of tokens.

In the description herein, the terms "input node", "output node", "participating node", "input address", and "output address" may be used. The reference to an "address" of a node is not meant to refer to a network address of a physical node. Instead the "address" is an address specified in a transaction on the blockchain having an allocation of tokens to which the physical node can claim ownership by having a key that corresponds to a signature on the transaction. In this sense, the "output address" is not an address of the participating node, but is a blockchain transaction output address that is owned by or associated with the participating output node. Likewise, the "input address" is an address of an available transaction output (in cryptocurrency terms, a UXTO) that is owned by or associated with the participating input node.

Commitment Channels

Various blockchain technologies, such as Bitcoin, may sometimes employ "commitment channels" in the construction of pairwise transactions between participating nodes. Commitment channels are designed to allow nodes to make multiple transactions without having all of the transactions committed to the blockchain. Once a commitment channel is established between a pair of participating nodes, the nodes can engage in as many transactions as they would like in a given time period, with only two of the transactions ultimately being added to the blockchain. As a result, the use of commitment channels can lead to a reduction in the number of transactions that are required to be added to the blockchain and a reduction in associated transaction costs. A commitment channel also offers a transferor node the flexibility of having tokens returned if specific criteria are not met by the transferee node or if either the transferor or transferee node determined to end the process after a certain set of transfers.

Figure 2:
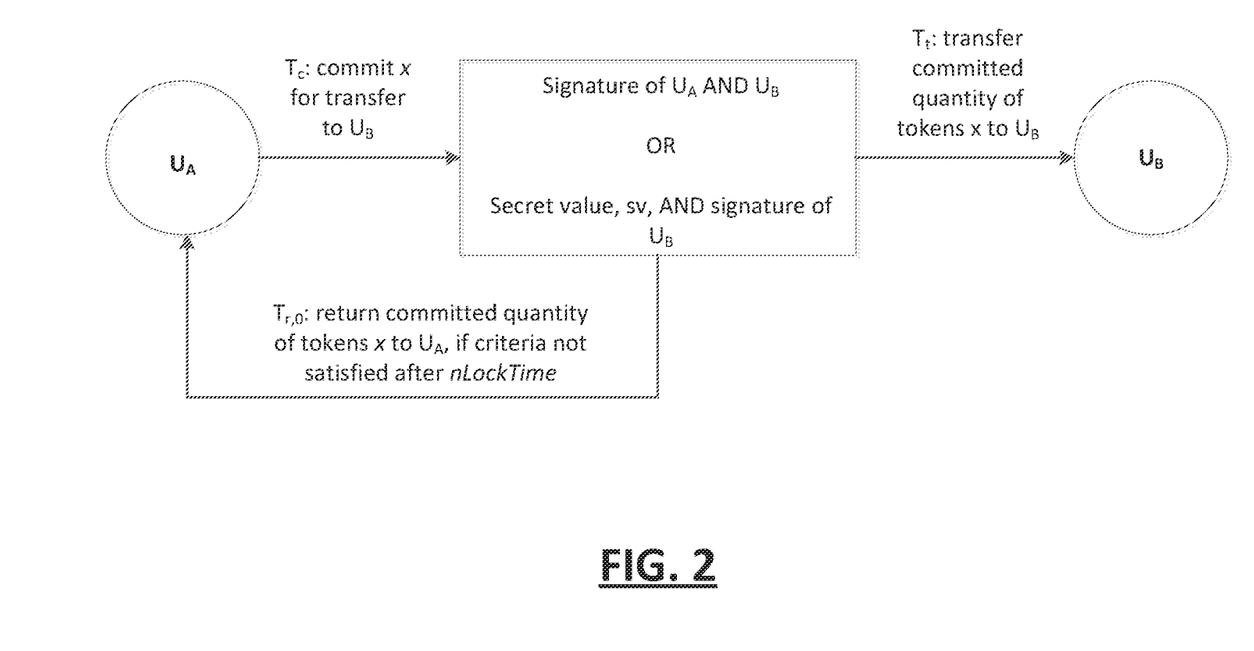
FIG. 2 shows a schematic diagram of a commitment channel established between a payer node and a payee node.

In at least one embodiment of a commitment channel implementation, a pair of participating nodes, $U_A$ and $U_B$, collaborate to generate three blockchain transactions: a commitment transaction ($T_c$), a return transaction ($T_{r,0}$), and a transfer transaction ($T_t$). FIG. 2 shows a schematic diagram of a commitment channel $U_A \rightarrow U_B$ between transferor node $U_A$ and transferee node $U_B$. The commitment transaction, $T_c$, represents the commitment component of the commitment channel in which the transferor $U_A$ sends/commits a specified set of tokens, x, for transfer to $U_B$. The commitment transaction may, in some embodiments, be a 2-of-2 multi-signature pay-to-script-hash (P2SH) transaction. The return transaction, $T_{r,0}$, is a transaction that returns the previously committed tokens, x, back to $U_A$ if the transferee node $U_B$ is unable to complete, in an allotted time, a stated criteria for the commitment transaction. The return transaction becomes eligible for submission to the blockchain after a specific point in time, nLockTime, has expired. For the return transaction to be executed successfully, it requires the signatures of both the transferor node $U_A$ and transferee node $U_B$. The transfer transaction, $T_{pay}$, is the transaction that actually sends the committed tokens, x, to the transferee node $U_B$. The transfer transaction is executed only if certain criteria are met by the transferee node $U_B$. For example, in order for the transfer transaction to be successfully submitted to the blockchain, it may require at least the digital signature of the transferee node U.

Secret Sharing

A technique called "secret sharing" has been developed to enable splitting a secret key into shares and distributing those shares among a set of participating nodes. In this technique any subset of the set of participating nodes may reconstruct the secret so long as the cardinality of the subset is greater than a specified threshold value t. If the cardinality of the subset is less than t then no information about the secret is revealed. This means that at least t participating nodes must collaborate to sign using the shared secret. The distribution of key shares among participating nodes may be done using a central dealer who assigns key shares, or through a dealer-less system of distribution. Each solution has its advantages and disadvantages requiring careful consideration of the requirements of the system being implemented when choosing between distribution methods.

In at least one embodiment, the technique may involve embedding the secret in a polynomial of degree t. Each of the n participating nodes is assigned a point on the then-unknown polynomial, resulting in the ability of t+1 participating nodes to accurately reconstruct the polynomial using Lagrange Polynomial Interpolation.

An application has been developed called Threshold Signature Scheme whereby m of n participating nodes in possession of individual key shares can cooperate to execute a cryptographic-based computation without the secret key being reconstructed/revealed to any of the individual participating nodes, and involving 2t+1 participating nodes to generate the signature.

The threshold signature scheme may, in some cases, rely on Lagrange Polynomial Interpolation. Lagrange Polynomial Interpolation tells us that a function $f(x)$ with degree t can be reconstructed with t+1 points $p=\{(x_1, f(x_1)), (x_2, f(x_2)), \ldots, (x_{t+1}, f(x_{t+1}))\}$ $$f(x) = \sum_{i \in p} f(x_i) \prod_{j \in p, j \neq i} \frac{x - x_j}{x_i - x_j} = \sum_{i \in p} f(x_i) b_{i,p}(x)$$

Where the Langrage coefficient $$b_{i,p}(x) = \prod_{j \in p, j \neq i} \frac{x - x_j}{x_i - x_j}$$

Note that: $b_{i,p}(x_i)=1$, and $b_{i,p}(x_j)=0$

It should be noted that various other techniques, such as those using elliptic curve and bilinear pairing or matrix projection, may be suitable for use in threshold signature schemes.

One element of the threshold signature calculations is the determination of x×G where x is the secret key and G is a point on the Elliptical Curve. Given a secret key x where its key shares are 'split' among n participating nodes:

Arbitrary secret x is the point $f(0)$ on polynomial $f(x)$

Shares (of key x) $x_1, x_2, \ldots, x_n$ correspond to $f(x_1), f(x_2), \ldots, f(x_n)$ If $f(x)$ is a t-degree polynomial, secret x can be interpolated by $x = \Sigma_{i \in \pi} b_{i,\pi} x_i$ where $\pi$ is a size t+1 subset of shares $x_a, x_b, \ldots, x_t, x_{t+1}$ and b is a Langrage coefficient, as mentioned above in connection with Lagrange Polynomial Interpolation.

$\pi$ is a group of t+1 participants collaborating to calculate x×G without revealing their individual $x_i$ shares. x is the x=0 point on a t-degree polynomial Each participant i calculates a part $b_{i,\pi} x_i \times G$ All participants in $\pi$ add their part together (reconstructing the secret x via Lagrange interpolation) giving:

$$b_{a,\pi} \times x_a \times G b_{b,\pi} \times x_b \times G + \ldots + b_{t+1,\pi} x_{t+1} \times G = x \times G$$

This process is referred to as "Secret Share Joining".

Indirect Anonymous Transfer Protocol

The present application describes methods and devices for transferring tokens between one or more transferor-transferee pairs. In particular, the present application proposes a token transfer protocol (Indirect Anonymous Transfer Protocol, or IATP) which attempts to disguise the transferor-transferee relationships by using a set of indirect transactions between multiple different pairs of participating nodes of the protocol, while avoiding the risk of partial completion of the transactions. The indirect transactions are designed in such a way that a connection between a transferor and an associated transferee is not easily identifiable from the blockchain data. The set of indirect transactions, if executed, result in the original desired allocation of tokens (i.e. transactions agreed to at the beginning of the protocol) for the participating transferor-transferee node pairs.

The IATP includes a plurality of participating nodes, where each participating node belongs to a transferor-transferee pair. In particular, the IATP is suitable for a group of three or more participating nodes, where at least one node in the group makes or receives one or more token transfers to/from another node in the group. In order to avoid ambiguity in the description below, the terms "sender" and "recipient" may be used to refer respectively to a transferor node and an associated transferee node that take part in the IATP.

Figure 3:
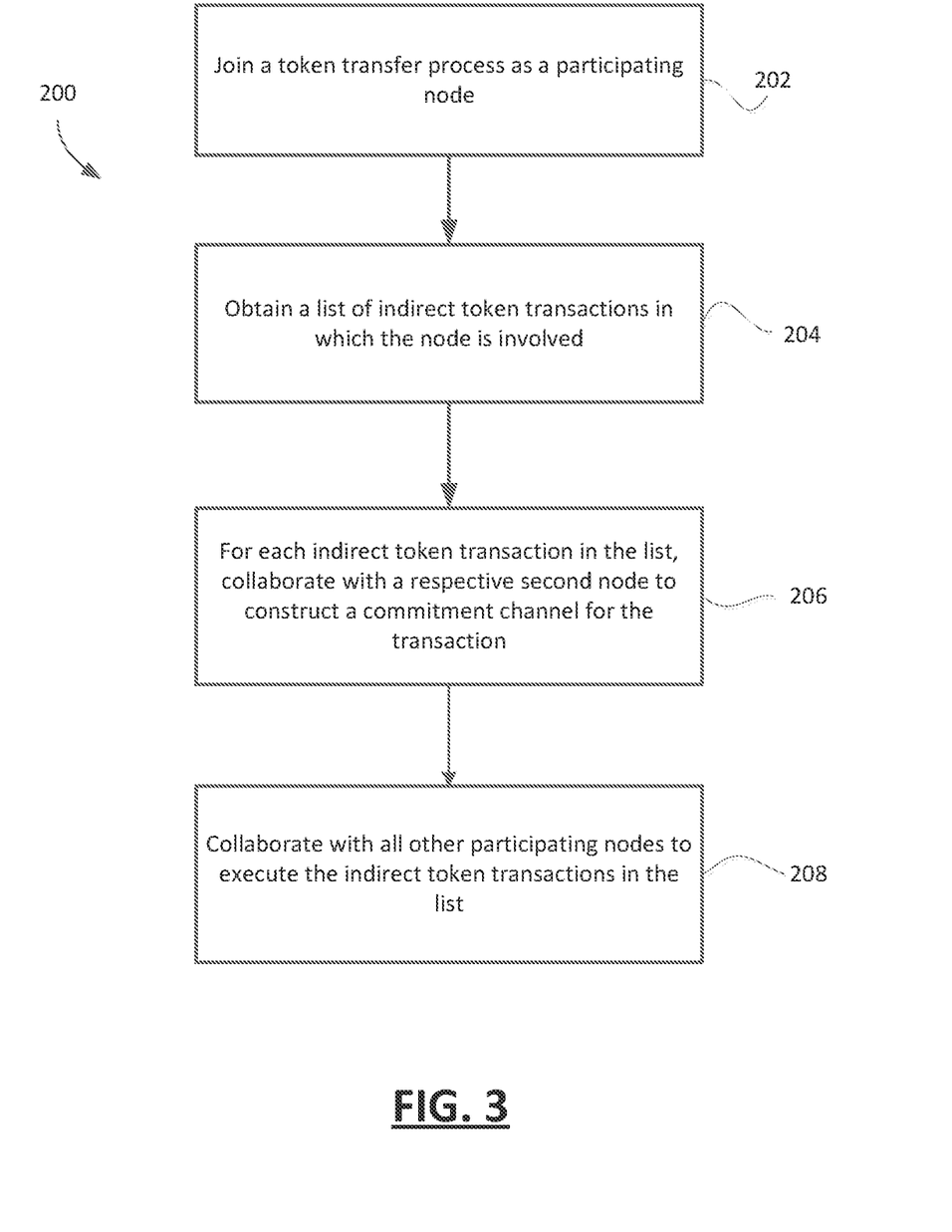
FIG. 3 shows, in flowchart form, an example method to participate in a token transfer process for transferring tokens between a transferor-transferee pair, in accordance with an embodiment of the present application.

Reference is now made to FIG. 3, which shows, in flowchart form, an example method 200 for participating in a token transfer process transferring a quantity of tokens from a sender node to a recipient node using a blockchain. A plurality of nodes corresponding to multiple sender-recipient pairs take part in the IATP. The nodes are indicated as $U_1, U_2 \ldots, U_n$ for a total of n nodes. The "nodes" may be referred to herein as members or participants or participating nodes. In some implementations, each node is a wallet or other such blockchain entity.

For simplicity, the description of the IATP uses the example of a single sender-recipient pair wishing to make a transaction of a certain amount, $\Delta^*$, via a plurality of indirect token transactions between n participating nodes. As will be explained below, the reasoning is easily extended to multiple sender-recipient pairs. That is, the use case of IATP to effect a transfer $\Delta^*$ between a single pair of participating nodes is readily generalizable to making transfers $\Delta_i^*$ between multiple pairs of participating nodes.

The method 200 is implemented by a node participating in the IATP. The set of participating nodes includes at least one pair of sender and recipient nodes, as well as a plurality of nodes, different from the sender and recipient nodes, that are used to make multiple pairwise indirect token transactions to disguise an intended transfer between the at least one sender-recipient pair. In particular, the behaviours of the sender node and the recipient node are governed in the same manner as any other participating node in the IATP.

The method 200 begins with the node joining the token transfer process in operation 202. The joining process has not been detailed herein and may be implemented in a decentralized manner or through a central authority that assembles a suitable group of participating nodes based, at least in part, on ensuring inclusion of a sufficient number of nodes in the group and one or more sender-recipient pairs wishing to transfer tokens between each other. In some embodiments, multiple sender-recipient pairs may join together to collaboratively participate in the IATP.

In operation 204, the participating node obtains a list of indirect token transactions for which the participating node is either an input node or an output node. That is, the participating node is notified about the indirect token transactions that it will be involved in. The list obtained by the participating node is a subset of a set of all indirect token transactions that are generated as part of the IATP.

The process for constructing a set of indirect token transactions through which an intended quantity of tokens is to be transferred between a sender-recipient pair will now be described. The IATP is based on the concept of disguising or mixing the transfer of tokens between sender-recipient pairs by having these transfers occur indirectly through a set of "indirect token transactions", featuring varying quantities of tokens, and between different pairs of participating nodes. In particular, the indirect token transactions include at least two transactions that are different from the direct transfer of a desired quantity of tokens from a sender to a recipient. That is, the set of indirect token transactions includes at least two transactions, each of which has its input and/or output nodes being different from the sender and recipient nodes, respectively.

The process of constructing this set of indirect token transactions is implemented by an initiator, $U_0$, which may be randomly chosen by the participating nodes of the IATP. One or more participating nodes of the protocol define the following:
- Number of rounds, r, of the protocol and number of transactions, q, per round
- An initial quantity of tokens available for use in the protocol, stored as a vector $m(0)=(m_1(0), \ldots, m_n(0))$ with $\Sigma_{i=1}^n m_1 = M$, where M is the total quantity of tokens committed to the protocol
- The final state in which the participating nodes are to be placed, $m(T_r)=(m_1(0), \ldots, m_A(0)-\Delta^*, \ldots, m_B(0)+\Delta^*, \ldots, m_n(0))$, i.e. the final allocation of tokens that is to be made between sender-recipient pair (e.g. $m_A$ and $m_B$)

The initial and final states may be stored in vector form, or in any other appropriate data structure.

An initiator node, which may be one of the participating nodes, receives the parameters (r, q, m(0), and $m(T_r)$) of the protocol set by one or more of the participating nodes and generates, based on the received parameters, a set of indirect token transactions between multiple different pairs of the participating nodes. An example embodiment of the construction procedure is detailed below:

Phase I

For t=1, ..., r−1:
a. The initiator node randomly selects q pairs (i, j), with i≠j.
b. The quantity of tokens, $m_i$, corresponding to $U_i$ is incremented by a random increment $\Delta_i$ from a probability distribution, $\varphi_i$, with the condition that $0<\Delta_i \leq \min(m_i(t), m_j(t))$
c. $U_j$ is decremented by $\Delta_j = \Delta_i$
d. At each step, the vector $m(t)=(m_1(t), \ldots, m_n(t))$ is updated In phase 1, the initiator node generates a plurality, or a first group, of random transactions that result in transfer of tokens between multiple pairs of the participating nodes. For each round of the protocol (i.e. rounds 1 through to r−1), q pairs of participating nodes are randomly selected, such that each of the q pairs engages in a transaction resulting in a transfer of a certain quantity, or indirect token quantity, of tokens $\Delta_i$ between the pairs. After each round, the quantity of tokens allocated to each of the participating nodes is updated to reflect the q transfer transactions (i.e. indirect token transactions). The quantity of tokens transferred in a round, $\Delta_i$, between each of the q pairs is limited to be within a prescribed range. In particular, the condition $0<\Delta_i \leq \min(m_i(t), m_j(t))$ is designed to ensure that, for each of the q pairs, the transferred quantity is (1) positive, and (2) less than the minimum of the allocated quantity of tokens associated with the nodes of the pair. In this way, the quantity of tokens allocated to the participating nodes of the IATP remains positive throughout the protocol rounds. The Ai values are selected from a probability distribution (e.g. a discrete uniform distribution); without loss of generality, the same probability distribution may be used for all participating nodes of the protocol.

Phase 2

For the final round, t=r, a sequence, or second group, of "final transactions" are generated to enforce the final condition reflecting the desired token transfer between the sender-recipient pair to be reached. To generate the sequence of final transactions needed to complete the protocol, the initiator node:
a. Computes the difference, $D=m(r-1)-m(r)=(m_1(r-1)-m_1(r), m_2(r-1)-m_2(r), \ldots, m_n(r-1)-m_n(r))$ b. Matches the smallest and largest element of the vector, D, and constructs the first transaction between the associated participating nodes
e.g., if $\max(D)=D_1$ and $\min(D)=D_4$, $D_4<0$, node 1 transfers to node 4 an amount A, where $A = \begin{cases} |\min(D)|, & \text{if } \max(D) > |\min(D)|; \\ \max(D), & \text{if } \max(D) \leq |\min(D)|. \end{cases}$ c. The vector D is updated, i.e. $D'=(D_1-A, D_2, \ldots, D_4+A, \ldots, D_n)$. The process is then repeated until D=0, i.e. all participating nodes reach the desired final stage.

In phase 2, a sequence of "final transactions" is generated, in order to reconcile the values of the vector m(r−1) from the penultimate round of the protocol with the desired final state, m(r). That is, the second group of transactions are used to reconcile net token transfer resulting from the first group of transactions with the net transfer of the desired quantities of tokens between sender and recipient node pairs. In the final state, all participating nodes that belong to at least one sender-recipient pair have their allocated token quantities incremented or decremented by the quantity originally prescribed. That is, where every participating node in the IATP is a sender and/or a recipient, the allocated tokens associated with (owned by) the participating nodes is adjusted according to the resultant values of the desired token transfers. The token quantities associated with the sender-recipient nodes in the final state reflect the desired token transfer between the sender-recipient pair. In particular, the desired quantities of tokens for transfer between a sender-recipient pair is reflected in the final state, and so this quantity is contemplated in generating the final transactions. That is, the set of indirect token transactions is generated based, at least in part, on the desired quantity of tokens to be transferred between the sender-recipient pair.

In the case of multiple sender-recipient pairs among the participating nodes, the final transactions will depend on the respective token quantities being transferred between the sender-recipient pairs. More specifically, the final state m(r) will reflect the transfers for a plurality of sender-recipient pairs.

It should be noted that in a real setting, it is not possible to "track" the tokens each participating node has; rather, it is possible to track the gain or loss per protocol step, by monitoring the transactions broadcast on the blockchain. Any reference to "stored" or "allocated" tokens in the description is for clarity in the illustration of the protocol steps. Using the IATP, sender-recipient pairs are able to indirectly transfer a quantities of tokens between each other, by moving randomized quantities of tokens $\Delta_i$ through multiple pairs of participating nodes, over the course of multiple rounds.

After the set of indirect token transactions is generated by the initiator node, each participating node is notified about the transactions that they are involved in. In particular, for each participating node of the IATP, the initiator node determines a subset of the set of all indirect token transactions that includes only those transactions for which the participant node is either an input node (i.e. transferor) or an output node (i.e. transferee). The initiator node sends a message identifying the subset of transactions to the respective participating node. In some embodiments, the initiator node may encrypt the message containing the subset of transactions using the participating node's public key.

In the IATP, although the indirect token transactions are sequentially generated through the r rounds of the protocol and can be represented as an ordered sequence of vectors containing one or more transactions, the transactions can be completed in a random order. The order of the vectors and the order in which the transactions within a vector are carried out do not affect the desired final net token allocation for each participant. Essentially, the indirect transactions that are to be executed to move tokens between participants can be done in any order. The only requirement for the correct transfers between sender-recipient pairs is that all of the indirect token transactions generated as part of the IATP are executed.

Returning to FIG. 2, in operation 206, for each indirect token transaction identified in the subset obtained by the participating node, the node collaborates with a respective second participating node to generate a commitment channel for the transaction between itself and the second participating node. In other words, for each indirect token transaction in which the participating node is involved, a commitment channel is constructed to facilitate the transaction. The commitment channels are used in the IATP to facilitate secure individual transactions between pairs of participating nodes for the set of indirect token transactions. In operation 208, the node collaborates with all other participating nodes of the IATP to execute the indirect token transactions in which it is involved, using the generated commitment channels. This collaboration between all of the participating nodes to execute the token transactions helps to ensure that all corresponding commitment channels are properly created and completed without enabling a node to cancel or renege on any of the transactions part way through. The technique for collaborating to execute the indirect token transactions will be detailed below with reference to FIG. 4.

Figure 4:
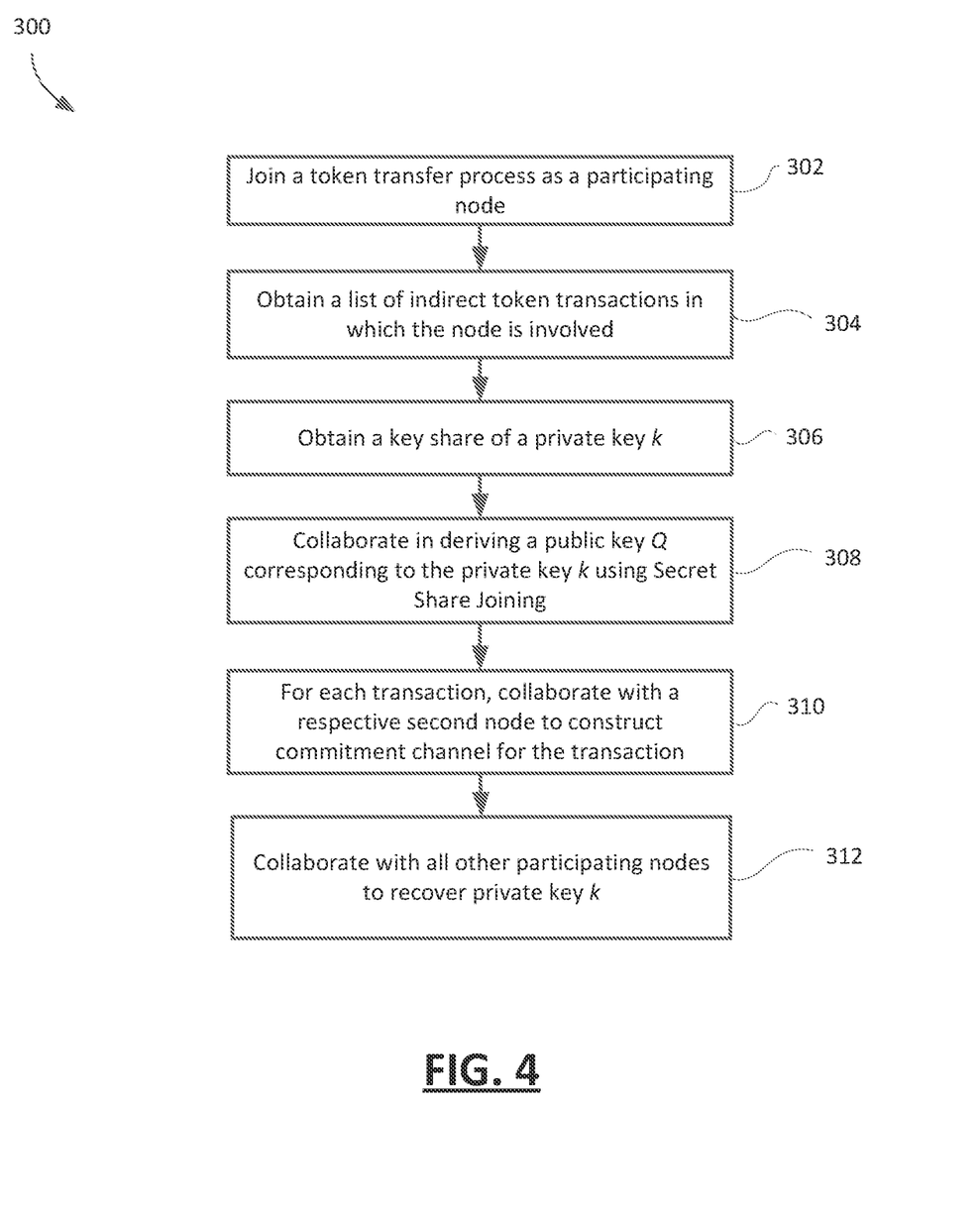
FIG. 4 shows, in flowchart form, another example method to participate in a token transfer process for transferring tokens between a transferor-transferee pair, in accordance with an embodiment of the present application.

Reference is now made to FIG. 4, which shows, in flowchart form, an example method 300 for participating in a token transfer process for transferring a quantity of tokens between a sender-recipient pair. The method 300 is implemented by a node participating in a protocol for indirect anonymous transfer, such as the IATP described herein. Operations 302 and 304 correspond to operations 202 and 204 of method 200 illustrated in FIG. 3. Specifically, in operation 302, the node joins a token transfer process and, in operation 304, the node obtains (e.g. from an initiator node of the protocol) a list/subset of indirect token transactions in which it is involved.

The method 300 incorporates a security protocol that governs the creation and execution of the indirect token transactions of the IATP. As explained above, the IATP involves a plurality of pairwise token transfers between participating nodes. As the transactions of the protocol are executed, some participants may receive tokens that result in a temporary gain in tokens allocated over the initial quantity of tokens that had been committed to the protocol by that node. That is, certain participant nodes may be "locally" better off in terms of possession of control tokens than their initial state (i.e. initial quantity of tokens committed) during the execution of the protocol. In order to prevent a participant node from leaving the protocol at a moment(s) when that node has a local token surplus, the IATP includes a mechanism by which each participating node of the protocol has the ability to prevent the execution of the set of indirect token transactions until the participant node confirms that the requisite commitment channels have been created.

To enable this security mechanism, each indirect token transaction corresponding to a commitment channel is secured by a public key Q of a secret value k such that $Q=kG$, where G is a basepoint on the Elliptic Curve. Prior to creation of the commitment channels required by the protocol, the value k is unknown to any participant. Each user is instead given a secret share, $k_i$, of the key k. Thus, in operation 306, the participating node obtains a key share of a private key, k. The key share is utilized in a function that produces the secret value k; in particular, all of the key shares $k_i$ of the participating nodes are required to produce the value k. The public key Q is used by the participating nodes when creating the commitment channels, such that the commitment channels can be unlocked only when all participants collaborate to reconstruct the secret value k. In the IATP, an arbitrary random secret is stored as $f(0)$ in a t degree polynomial $f(x)$ and only participant i can calculate its share, $f(x_i)$. If t+1 out of n participants collaborate, they can reconstruct any point on $f(x)$ with their shares $k_1$, $k_2, \ldots, k_n$ which correspond to $f(x_1), f(x_2), \ldots, f(x_n)$ using, for example, Lagrange Polynomial Interpolation.

In operation 308, the participating node collaborates with all other nodes of the protocol to generate a public key, Q, corresponding to the private key, k, using secret share joining. As mentioned above, the public key Q is used in generating the indirect token transactions. The calculation of Q is accomplished without any participant node revealing their individual key shares and without the participants collaborating to first find the private key, k.

In the IATP, participants of the protocol can verify that they are given correct key shares k, consistent with the public key Q used to create the commitment channels. If inconsistent shares are distributed among the participating nodes, the participants will not be able to reconstruct the secret k, as required by the protocol. In at least some embodiments, a Publicly Verifiable Secret Sharing (PVSS) scheme may be employed for participants' key shares verification. In a PVSS scheme, each participant $U_1$ has a decryption function $D_i$, which is able to access the information encrypted with the corresponding public encryption function, $E_i$. The dealer can then use the public encryption function to distribute the shares and publish them in the form, $$K_i = E_i(k_i), i = 1, \ldots, n$$

The encrypted shares can be publicly verified by any interested individual; anyone (and not just the participants themselves) can verify that the participants received correct key shares.

Once the public key, Q, is obtained, the indirect token transactions among the participating nodes of the protocol can be set up. The indirect transfers between different pairs of participating nodes are accomplished through the use of commitment channels. In the IATP, a "commitment channel" is defined by three separate transactions: a commitment transaction, $T_c$, a return transaction, $T_{r,0}$, and a transfer transaction, $T_r$. That is, without loss of generality, for each indirect transfer made between transferor node IA and transferee node $U_B$, three blockchain transactions are created:

- The commitment transaction, $T_c$, is a 2-of-2 multi-signature P2SH transaction that $U_A$ utilizes to commit a quantity of tokens, x, for transfer to $U_B$ (i.e. an output address of the transaction)
- The return transaction, $T_{r,0}$, returns the committed quantity of tokens x back to $U_A$ (i.e. an input address of the transaction)
- The transfer transaction, $T_t$, actually transfers the committed quantity of tokens r to $U_B$ (i.e. an output address of the transaction)

Each commitment channel that is generated as part of the IATP is "locked" by a secret value. In at least one implementation of the IATP, the secret value for a commitment channel $U_A \rightarrow U_B$ is $k+k_B$, where k is the private key corresponding to public key Q, and $k_B$ is a random number chosen by transferee node, $U_B$. As will be described below, an encrypted value, $Q_B$, of the secret value $sv_B=k+k_B$ can be calculated by the transferor node $U_A$ and used during the construction of the commitment channel, $U_A \rightarrow U_B$.

Figure 5:
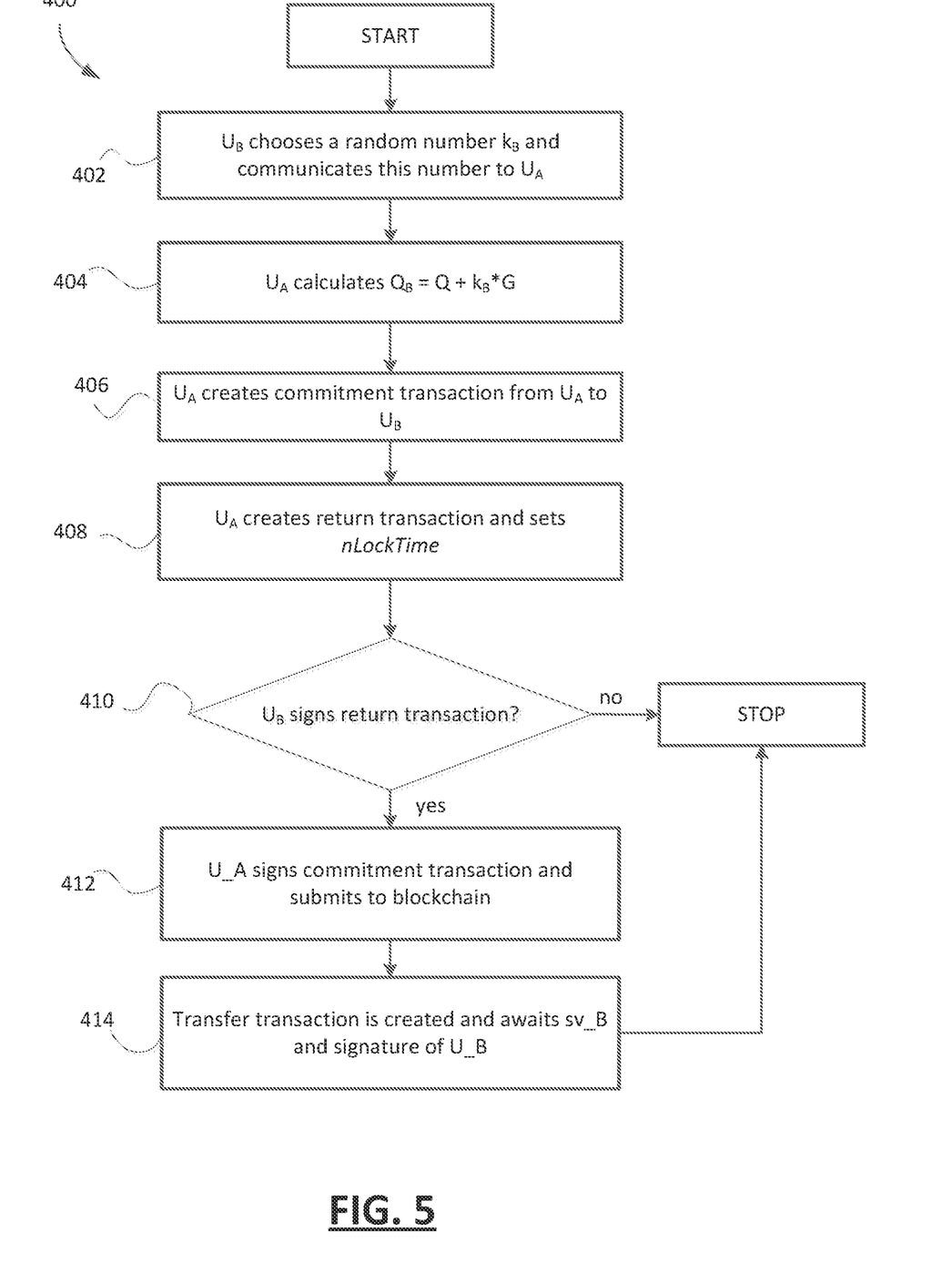
FIG. 5 shows, in flowchart form, an example process for constructing a commitment channel between a transferor node and a transferee node in an indirect anonymous transfer protocol.

An example process 400 for constructing a commitment channel, $U_A \rightarrow U_B$, is illustrated in FIG. 5:

1. Operation 402: $U_B$ chooses a random number $k_B$. Each commitment channel may utilize a different random number, in order to make it more difficult for external parties to be able to associate a set of transactions as being elements of the same instance of an IATP. In particular, being able to link the different transactions visible in the blockchain to a common instance of an IATP can be made more complicated, as the transactions are not all tagged with the same secret.
2. Operation 402: $U_B$ communicates the value of $k_B$ to $U_A$.
3. Operation 404: $U_A$ calculates $Q_B$, using the relation $$Q_B=(k+k_B)G=kG+k_BG=Q+k_BG$$

where is Q collaboratively obtained (by secret share joining) and is considered an encryption of the secret key k.

4. Operation 406: $U_A$ utilizes the encrypted value $Q_B$ and creates a commitment transaction, $T_c$, which commits a quantity of tokens x that can only be spent by either (1) the signatures of both $U_A$ and $U_B$, or (2) $sv_B$ and the signature of $U_B$.
5. Operation 408: $U_A$ creates a return transaction, $T_{r,0}$, which returns the entirety of the committed quantity of tokens x (less any transactional costs that may consume one or more tokens) to $U_A$. The return transaction contains a parameter, nLockTime, which specifies a point in time after which the return transaction becomes eligible for submission to the blockchain.
6. Operation 410: $U_B$ signs the return transaction.
7. Operation 412: $U_A$ signs the commitment transaction and submits it to the blockchain.
8. Operation 414: A transfer transaction, $T_t$, is created, by either transferor $U_A$ or transferee $U_B$, which transfers the committed quantity of tokens x of the commitment transaction to $U_B$. The unlocking script, or <scriptSig>, for the transfer transaction needs to contain a value $sv_B$ if the transaction is to be successfully submitted to the blockchain.

Accordingly, in operation 310, for each transaction included in the subset of indirect token transactions for the participating node, the node collaborates with its counterpart in the transaction to construct a commitment channel. In particular, if the participating node is a transferor in a transaction, the node (1) creates a commitment transaction using the random value $k_B$ communicated by $U_B$ (the counterpart in the transaction), and (2) creates a return transaction which returns the committed tokens to the node.

After all commitment channels have been created for every necessary transaction of the IATP instance, in operation 312, the node collaborates with all other participating nodes in the protocol to recover the private key, k, using its key share and a suitable secret sharing scheme (e.g. Shamir's secret sharing). Once the value of k is determined, if the participating node is a transferee of a commitment channel, the node utilizes the secret value, $sv_B=k+k_B$, in the <scriptSig> of the corresponding transfer transaction in order to obtain the transferred quantity of tokens. All of the transfer transactions, $T_t$, of the IATP instance can then be submitted to the blockchain. The transfer transactions may be broadcast in an unstructured way, and may be in a random order or any order decided by the participant nodes submitting the transactions. The randomness in the ordering in which the transactions are broadcast may help to make the final and initial stage of the protocol more difficult to trace and recognize.

In at least some instances of IATP, each of the input and output addresses provided by a participating node for the indirect transfer transactions that the node is involved with are unique. That is, no address of the node, whether an input or an output address, is reused at any point in the IATP protocol. In other words, in some cases, a restriction may be imposed on the participating nodes of the IATP such that if a node $U_i$ serves as an input node in $n_{i1}$ indirect transfer transactions and as an output node in $n_{i2}$ indirect transfer transactions, $U_i$ is required to have at least $n_{i1}+n_{i2}$ separate addresses and sufficient funds already available at those addresses serving as inputs prior to joining the IATP. These multiple "disconnected" addresses can facilitate having multiple commitment channels of a participant existing concurrently and provide increased anonymity to the transactions in which the participating node is involved, by making it more difficult for external parties to trace the flow of tokens to and from the participating node.

Figure 6:
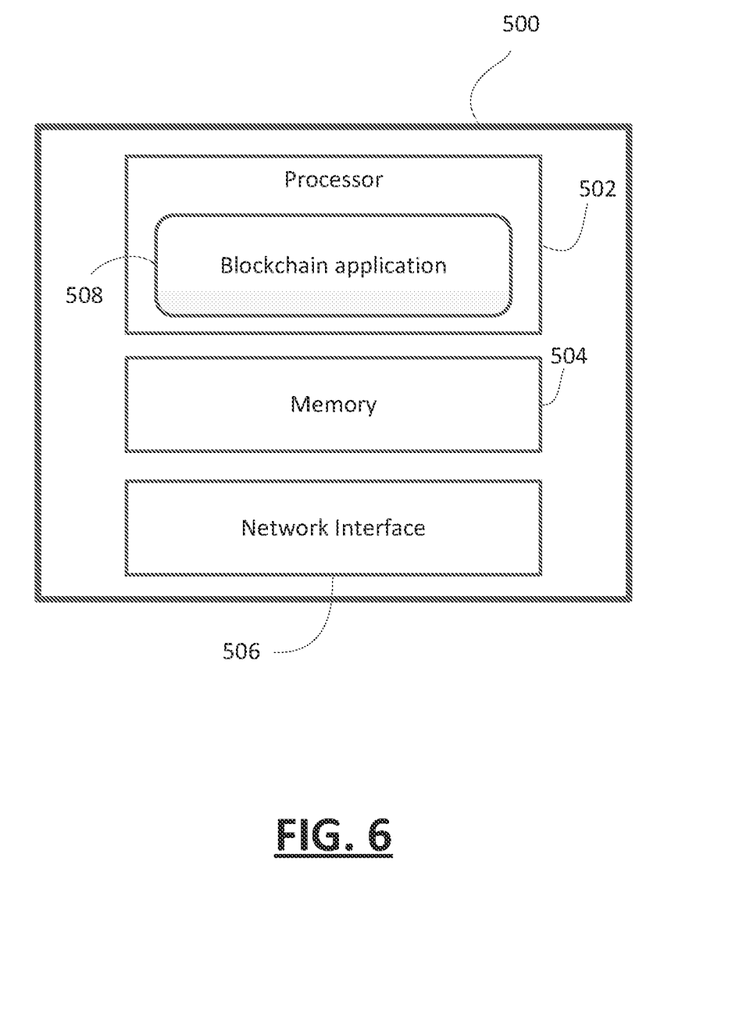
FIG. 6 shows a block diagram of a simplified participating node.

Reference will now be made to FIG. 6, which shows, in block diagram form, a simplified example of a participating node 500. The node 500 may be an input node or an output node. The node 500 includes a processor 502, which may include one or more microprocessors, application specific integrated chips (ASICs), microcontrollers, or similar computer processing devices. The node 500 further includes memory 504, which may include persistent and non-persistent memory, to store values, variables, and in some instances processor-executable program instructions, and a network interface 506 to provide network connectivity over wired or wireless networks.

The node 500 includes a processor-executable blockchain application 508 containing processor-executable instructions, that, when executed, cause the processor 502 to carry out one or more of the functions or operations described herein.

It will be understood that the devices and processes described herein and any module, routine, process, thread, application, or other software component implementing the described method/process for configuring the participating node may be realized using standard computer programming techniques and languages. The present application is not limited to particular processors, computer languages, computer programming conventions, data structures, and other such implementation details.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A computer-implemented method to participate in a token transfer process for transferring a first quantity of tokens from a sender node to a recipient node using a blockchain, the token transfer process including a plurality of participating nodes and execution of a set of indirect token transactions between multiple pairs of the participating nodes, the sender node and the recipient node being included in the token transfer process as participating nodes, the method, implemented at a participating node, comprising:

obtaining a subset of the set of indirect token transactions, the subset including those transactions for which the participating node is either an input node or an output node, wherein the set of indirect token transactions is generated based on the first quantity of tokens and a predefined number of transaction rounds in the token transfer process;

for each indirect token transaction in the subset, collaborating with a respective second participating node included in the indirect token transaction to generate a commitment channel for the indirect token transaction between the participating node and the second participating node; and collaborating with all other participating nodes in executing the indirect token transactions of the subset using the generated commitment channels;

wherein generating the commitment channel for each indirect token transaction comprises:

calculating a value for the commitment channel derived from a first public key (Q), wherein each participating node has a key share of a first private key (k) corresponding to the first public key;

collaborating with the second participating node to, using the value, generate a first blockchain transaction ($T_c$) for committing an indirect quantity of tokens to transfer to an output address of the indirect token transaction;

generating a second blockchain transaction ($T_{r,0}$) that returns the committed indirect quantity of tokens to an input address of the indirect token transaction; and generating a third blockchain transaction ($T_t$) for executing transfer of the committed indirect quantity of tokens to the output address of the indirect token transaction.

2. The computer-implemented method claimed in claim 1, wherein the first blockchain transaction ($T_c$) is submitted to the blockchain after the second blockchain transaction ($T_{r,0}$) is signed by an output node of the indirect token transaction.

3. The computer-implemented method claimed in claim 1, wherein the second blockchain transaction ($T_{r,0}$) includes a transaction parameter (nLockTime) specifying a point in time after which the second blockchain transaction becomes eligible for submission to the blockchain.

4. The computer-implemented method claimed in claim 1, wherein the set of indirect token transactions is further based on a predefined number of transactions per transaction round.

5. The computer-implemented method claimed in claim 1, wherein the participating nodes include a plurality of sender-recipient pairs and wherein the set of indirect token transactions is generated based on respective quantities of tokens associated with the plurality of sender-recipient pairs.

6. The computer-implemented method claimed in claim 1, wherein, for each indirect token transaction of the set, an indirect quantity of tokens for the indirect token transaction is less than a threshold value that is dependent on a committed quantity of tokens made available by a transferor.

7. A computing device to participate in a token transfer process including a plurality of participating nodes, the computing device being one of the participating nodes, the computing device comprising:

a processor;
   memory;
   a network interface to provide network connectivity; and
   a blockchain application containing computer-executable instructions that, when executed by the processor, cause the processor to carry out the computer-implemented method claimed in claim 1.

8. A non-transitory processor-readable medium storing processor-executable instructions to participate in a token transfer process including a plurality of participating nodes, wherein the processor-executable instructions, when executed by a processor in one of the participating nodes, cause the processor to carry out the computer-implemented method claimed in claim 1.

* * * * *